(12) United States Patent
Yamashita et al.

(10) Patent No.: US 7,228,445 B2
(45) Date of Patent: Jun. 5, 2007

(54) CLOCK FREQUENCY CONTROL METHOD AND ELECTRONIC APPARATUS

(75) Inventors: Michio Yamashita, Inagi (JP); Katsuki Uwatoko, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 522 days.

(21) Appl. No.: 10/607,218

(22) Filed: Jun. 27, 2003

(65) Prior Publication Data

US 2004/0073826 A1  Apr. 15, 2004

(30) Foreign Application Priority Data

Jun. 28, 2002  (JP)  ............................. 2002-190890

(51) Int. Cl.
*G06F 1/04*  (2006.01)
*G06F 1/32*  (2006.01)
(52) U.S. Cl. ...................................... 713/322; 713/320
(58) Field of Classification Search ................... None
See application file for complete search history.

(56) References Cited

U.S. PATENT DOCUMENTS

| 5,452,277 A |   | 9/1995 | Bajorek et al. |
| 5,564,015 A | * | 10/1996 | Bunnell ........................ 714/47 |
| 6,513,124 B1 | * | 1/2003 | Furuichi et al. ............. 713/322 |
| 6,931,559 B2 | * | 8/2005 | Burns et al. ................. 713/340 |

FOREIGN PATENT DOCUMENTS

| EP | 0 320 329 A2 | 6/1989 |
| JP | 1-292416 | 11/1989 |
| JP | 11-353052 | 12/1999 |

OTHER PUBLICATIONS

Christopher J. Hughes et al., Saving Energy with Architectural and Frequency Adaptations for Multimedia Applications, Conference Proceedings Article, Dec. 1, 2001, pp. 250-260, Proceedings. 34th ACM/IEEE International Symposium Dec. 1-5, 2001, Piscataway, NJ.
Kinshuk Govil et al., Comparing Algorithms for Dynamic Speed-Setting of a Low-Power CPU, available at http://citeseer.ist.psu.edu/govil95comparing.html.
Communication pursuant to Article 96(2) EPC mailed Apr. 24, 2006, from European Patent Office in European Patent Application No. 03014280.6-2006.
Minutes of Telephone Conversation of Apr. 28, 2006, from European Patent Office in European Patent Application No. 03014280.6-2006.
Notification of Reasons for Rejection issued by Japanese Patent Office mailed on Feb. 8, 2005, in Japanese Application No. 2002-190890.

* cited by examiner

*Primary Examiner*—A. Elamin
*Assistant Examiner*—Anand B. Patel
(74) *Attorney, Agent, or Firm*—Finnegan, Henderson, Farabow, Garrett & Dunner, L.L.P.

(57) ABSTRACT

An electronic apparatus includes a clock oscillator which supplies a clock signal, a processor which generates an internal clock on the basis of the clock signal supplied from the clock oscillator, and a control unit which controls a frequency of the internal clock in accordance with a ratio of an executable instruction count per unit time to a clock count per unit time of the internal clock generated by the processor.

14 Claims, 5 Drawing Sheets

| S | Mode type |
|---|---|
| 0.9 | Power saving mode |
| 0.5 | Standard mode |
| 0.1 | High-speed mode |

CLOCK FREQUENCY CONTROL METHOD AND ELECTRONIC APPARATUS

CROSS-REFERENCE TO RELATED APPLICATIONS

This application is based upon and claims the benefit of priority from prior Japanese Patent Application No. 2002-190890, filed Jun. 28, 2002, the entire contents of which are incorporated herein by reference.

BACKGROUND OF THE INVENTION

1. Field of the Invention

The present invention relates to a method of controlling the clock frequency of a processor and, more particularly, to a method of controlling power in an electronic apparatus having a processor.

2. Description of the Related Art

In a method of saving the power of an electronic apparatus such as a computer, the operating clock frequency (or operating speed) of a processor (e.g., a CPU) is decreased to suppress power consumption of the processor. According to this method, the use ratio of the processor, the battery capacity, and the heat generation state of the processor are monitored, and power saving control is executed on the basis of these pieces of information.

For example, when a flag representing a busy state or the like is set in a predetermined memory area every time the processor accesses an I/O device or memory, the operating system (OS) (or driver software accessory to the OS) acquires the degree of load on the processor on the basis of the flag set count, obtaining the use ratio of the processor. When the OS determines that, for example, the use ratio of the processor is low, the OS decreases the clock frequency of the processor in power saving control.

The OS tends to recognize a value higher than the substantial use ratio of the processor owing to stall processing. This phenomenon readily occurs particularly for a high I/O access count or a large number of cache errors.

That is, even for a substantially low use ratio of the processor, the OS determines that the use ratio is high, and hardly decreases the clock frequency of the processor. In this case, power consumption of the processor cannot be efficiently suppressed.

The substantial use ratio of the processor may be detected by arranging specific hardware. However, newly arranging specific hardware undesirably leads to a high cost and large mounting space.

Jpn. Pat. Appln. KOKAI Publication No. 11-353052 discloses the following processor operating speed control method. The ratio between the performance index and power consumption index of a computer is used as an energy index. The CPU operating speed (operating frequency) is increased/decreased on the basis of the energy index, and power management processing which balances power saving and performance is executed. However, the technique of this reference is not designed to save power by paying attention to the substantial use ratio of a processor.

BRIEF SUMMARY OF THE INVENTION

Embodiments of the present invention provide a method and electronic apparatus for controlling power consumption corresponding to the substantial use ratio of a processor.

According to one aspect of the present invention, there is provided a method of controlling a clock frequency of a processor, comprising acquiring an executable instruction count per unit time of the processor; acquiring a clock count per unit time of the processor; determining whether a ratio of the executable instruction count to the clock count exceeds a predetermined value; and controlling the clock frequency of the processor in accordance with a result of the determination.

According to another aspect of the present invention, there is provided an electronic apparatus, comprising a clock oscillator configured to supply a clock signal; a processor configured to generate an internal clock on the basis of the clock signal supplied from the clock oscillator; and a control unit configured to control a frequency of the internal clock in accordance with a ratio of an executable instruction count per unit time to a clock count per unit time of the internal clock generated by the processor.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
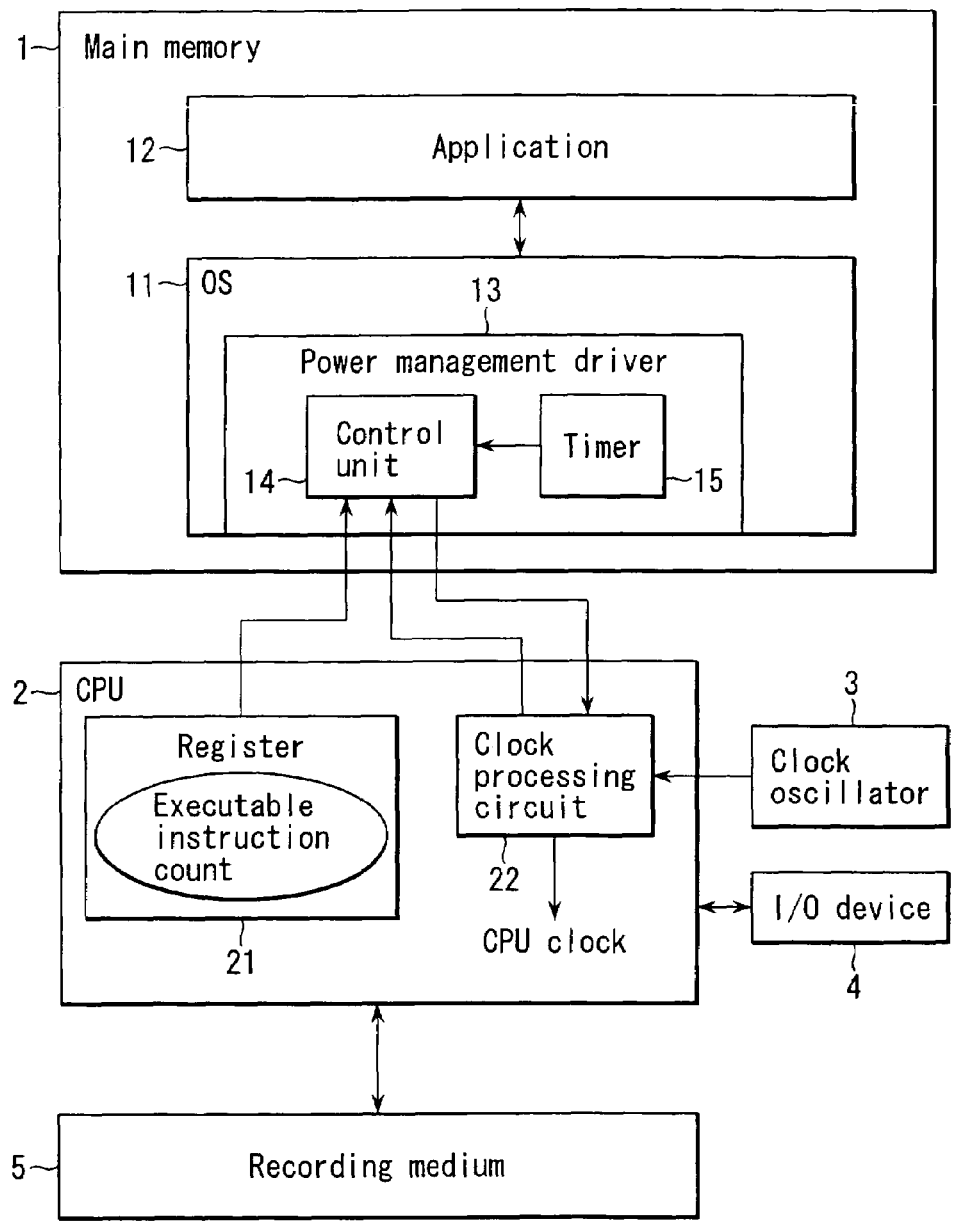
FIG. 1 is a block diagram showing the arrangement of the main part of an electronic apparatus according to an embodiment of the present invention.

FIG. 1 is a block diagram showing the arrangement of the main part of an electronic apparatus according to the embodiment of the present invention.

The electronic apparatus according to the embodiment is an information apparatus such as a personal computer. The electronic apparatus includes a main memory 1, central processing unit (CPU) 2, clock oscillator 3, input/output (I/O) device 4, and recording medium 5.

The main memory 1 is provided as the work area of the CPU 2. The main memory 1 holds an OS 11, application 12, and power management driver 13 (contained in the OS 11) which are processed by the CPU 2.

The OS 11 controls the operation of the application 12 and also the operation of the power management driver 13. The application 12 is software which runs under the management of the OS 11. The power management driver 13 is a kind of software driver which performs control corresponding to specific hardware, and is a driver especially for executing power management.

The power management driver 13 has a control unit 14 and timer 15. The control unit 14 corresponds to software for realizing power saving in the embodiment. The control unit 14 can control the frequency of an internal clock which is generated by the CPU 2 in accordance with the ratio of an executable instruction count per unit time (to be also simply referred to as an executable instruction count hereinafter) to a clock count per unit time of the CPU 2 (to be also simply referred to as a clock count hereinafter). The clock count and executable instruction count can be acquired from the CPU 2. The control unit 14 will be described in detail below. The timer 15 is used by the control unit 14 when counting, e.g., the wait time (to be described later).

The CPU 2 controls the overall electronic apparatus, uses the main memory 1 as a work area, and executes various software programs. The CPU 2 incorporates a register 21 which holds the executable instruction count. The executable instruction count held by the register 21 changes depending on the processing status of the CPU 2. The executable instruction count can be referred to outside the CPU 2.

The CPU 2 also incorporates a clock processing circuit 22. The clock processing circuit 22 generates an internal clock used by the CPU 2 on the basis of a clock signal supplied from the clock oscillator 3. The clock processing circuit 22 changes the frequency of the internal clock in accordance with an instruction from the control unit 14.

The clock oscillator 3 generates a reference clock signal and supplies it to (the clock processing circuit 22 of) the CPU 2. The I/O device 4 inputs/outputs data to/from the CPU 2.

The recording medium 5 corresponds to a hard disk drive (HDD) or the like. When the electronic apparatus is powered off, the recording medium 5 saves various software programs and data such as the OS 11, application 12, and power management driver 13.

Figures 2, 3:
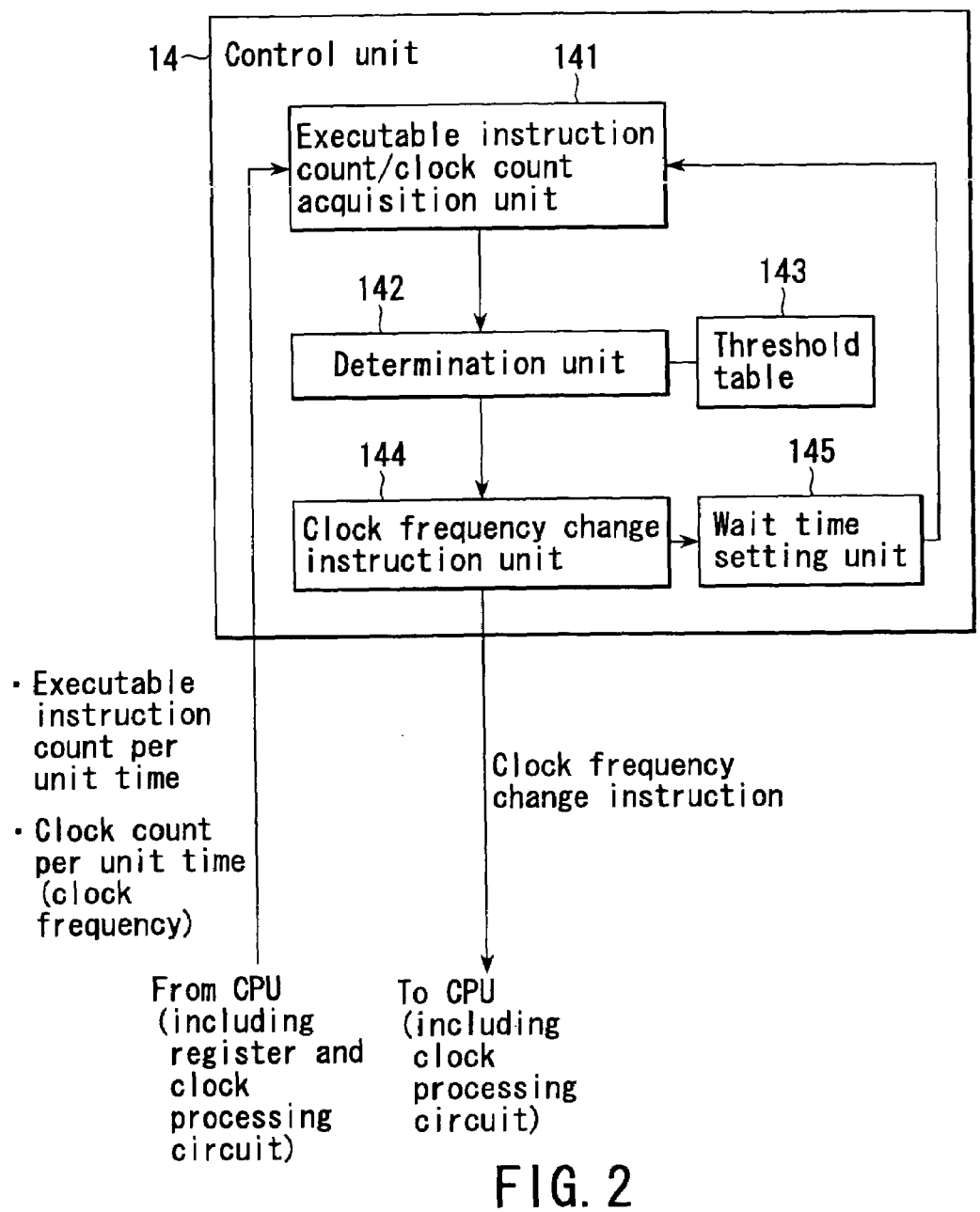
FIG. 2 is a block diagram showing an example of the functional arrangement of a control unit in FIG. 1.
FIG. 3 is a table for explaining the contents of a threshold table in FIG. 2.

FIG. 2 is a block diagram showing an example of the functional arrangement of the control unit 14 in FIG. 1.

The control unit 14 includes an executable instruction count/clock count acquisition unit 141, determination unit 142, threshold table 143, clock frequency change instruction unit 144, and wait time setting unit 145.

The executable instruction count/clock count acquisition unit 141 is activated by the wait time setting unit 145 at a predetermined time interval. The executable instruction count/clock count acquisition unit 141 accesses the register 21 of the CPU 2 to acquire an executable instruction count, and accesses the clock processing circuit to acquire a clock count. These pieces of information are used by the determination unit 142.

The determination unit 142 is activated by the executable instruction count/clock count acquisition unit 141. The determination unit 142 performs predetermined calculation (to be described later) by using the executable instruction count and clock count that are acquired by the executable instruction count/clock count acquisition unit 141. The determination unit 142 determines whether to increase/decrease the clock frequency of the CPU 2 (or keep it unchanged) in accordance with whether the calculation result exceeds a threshold (predetermined value).

Examples of calculation adopted in the determination unit 142 are as follows.

Calculation 1

Calculation "$I/I_0$" ($I$ is the executable instruction count per unit time, and $I_0$ is the clock count per unit time) is executed.

Calculation 2

Calculation "$(I_n-I_{n-1})/I_0$" ($I_n$ is the executable instruction count per unit time in the nth acquisition, and $I_0$ is the clock count per unit time), or calculation "$(I_{n-1}-I_n)/I_0$" is executed.

Calculation 3

Calculation "$(I_n*\alpha_n+I_{n-1}*\alpha_{n-1}+ \ldots )/(I_{0n}*\alpha_n+I_{0(n-1)}*\alpha_{n-1}+ \ldots )$" ($I_n$ is the executable instruction count per unit time in the nth acquisition, $I_{0n}$ is the clock count per unit time in the nth acquisition, and $\alpha_n$ is the weighting factor applied to information in the nth acquisition) is executed. In this case, $\alpha_{n-1}$ is a value smaller than $\alpha_n$, $\alpha_{n-2}$ is a value smaller than $\alpha_{n-1}$, . . . . With this setting, calculation which puts importance on the latest information rather than information acquired in the past. The weighting factors $\alpha_n$, $\alpha_{n-1}$, . . . are properly calculated using an algorithm or the like on the basis of the reference weighting factor $\alpha$ which is stored in advance in a predetermined memory area.

The determination unit 142 looks up the threshold table 143 and selects a threshold (predetermined value) used for determination. As shown in FIG. 3, the threshold table 143 describes concrete values of a threshold S used in accordance with various modes (operation modes of the CPU 2). In the example of FIG. 3, the threshold S is 0.9 when the CPU 2 is in a power saving mode, 0.5 when the CPU 2 is in a standard mode, and 0.1 when the CPU 2 is in a high-speed mode. That is, the determination unit 142 selects a threshold (predetermined value) corresponding to the operation mode of the CPU 2 by looking up the threshold table 143. Information on the operation mode (power saving mode, standard mode, high-speed mode, or the like) of the CPU 2 can be acquired from the power management driver 13.

The clock frequency change instruction unit 144 is activated by the determination unit 142. The clock frequency change instruction unit 144 sends to the clock processing circuit 22 an instruction to increase/decrease the clock frequency of the CPU 2 by a predetermined amount in accordance with whether the calculation result by the determination unit 142 exceeds the threshold (predetermined value). In this case, the clock frequency is so increased/decreased as not to recognize a change in performance by the user. The current clock frequency of the CPU 2 can be acquired from the CPU 2.

In the embodiment, the clock processing circuit 22 is instructed to change the clock frequency of the CPU 2. Instead, the clock oscillator 3 may be instructed to change the frequency of a generated clock.

The wait time setting unit 145 is activated by the clock frequency change instruction unit 144. After a preset wait time has elapsed, the wait time setting unit 145 activates the executable instruction count/clock count acquisition unit 141. The set wait time can be changed, as needed. For example, the wait time may be changed in correspondence with the type of currently set operation mode of the CPU 2.

Three operation examples in the embodiment will be explained with reference to FIGS. 1 and 2 and the flowcharts of FIGS. 4 to 6.

<First Operation Example>

Figure 4:
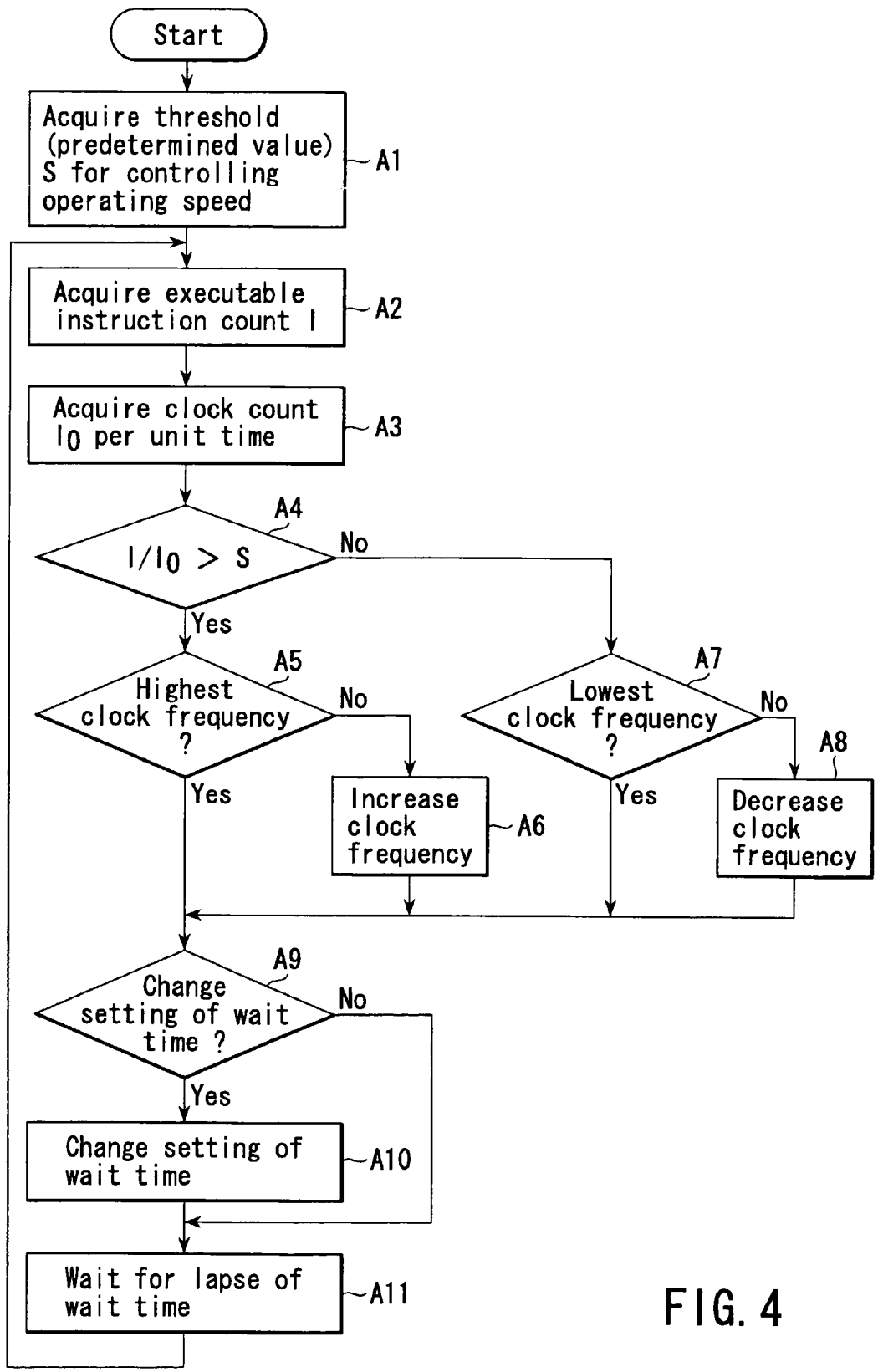
FIG. 4 is a flowchart showing the first operation example in the embodiment.

FIG. 4 shows operation corresponding to calculation 1 described above.

When the electronic apparatus is activated, the determination unit 142 recognizes the type of operation mode of the CPU 2, and acquires a threshold S corresponding to the operation mode in advance by looking up the threshold table 143 (step A1). When the operation mode changes, the threshold S changes to a value corresponding to the mode.

The executable instruction count/clock count acquisition unit 141 of the control unit 14 acquires an executable instruction count I per unit time and a clock count $I_0$ per unit time, and sends these pieces of information to the determination unit 142 (steps A2 and A3).

The determination unit 142 executes calculation "$I/I_0$" (I is the executable instruction count per unit time, and $I_0$ is the clock count per unit time). The determination unit 142 determines whether the calculation result exceeds the threshold S (step A4).

If the determination unit 142 determines that the calculation result exceeds the threshold S (YES in step A4), and the clock frequency of the CPU 2 is not highest (NO in step A5), the clock frequency change instruction unit 144 performs control of increasing the clock frequency by a predetermined amount (step A6). If the clock frequency of the CPU 2 is highest (YES in step A5), the clock frequency is not changed.

If the determination unit 142 determines that the calculation result does not exceed the threshold S (NO in step A4), and the clock frequency of the CPU 2 is not lowest (NO in step A7), the clock frequency change instruction unit 144 performs control of decreasing the clock frequency by a predetermined amount (step A8). If the clock frequency of the CPU 2 is lowest (YES in step A7), the clock frequency is not changed.

The wait time setting unit 145 determines whether to change the setting of the wait time (step A9). If YES in step A9, the wait time setting unit 145 changes the setting of the wait time (step A10), and waits for the lapse of the changed wait time (step A11). Upon the lapse of the wait time, the wait time setting unit 145 activates the executable instruction count/clock count acquisition unit 141. If NO in step A9, the wait time setting unit 145 waits for the lapse of the wait time which has already been set (step A11). Upon the lapse of the wait time, the wait time setting unit 145 activates the executable instruction count/clock count acquisition unit 141.

In this manner, in the first operation example, whether the ratio of the executable instruction count to the clock count exceeds a predetermined value is determined. The clock frequency of the CPU 2 is controlled in accordance with the determination result, achieving power saving corresponding to the substantial use ratio of the CPU 2.

<Second Operation Example>

Figure 5:
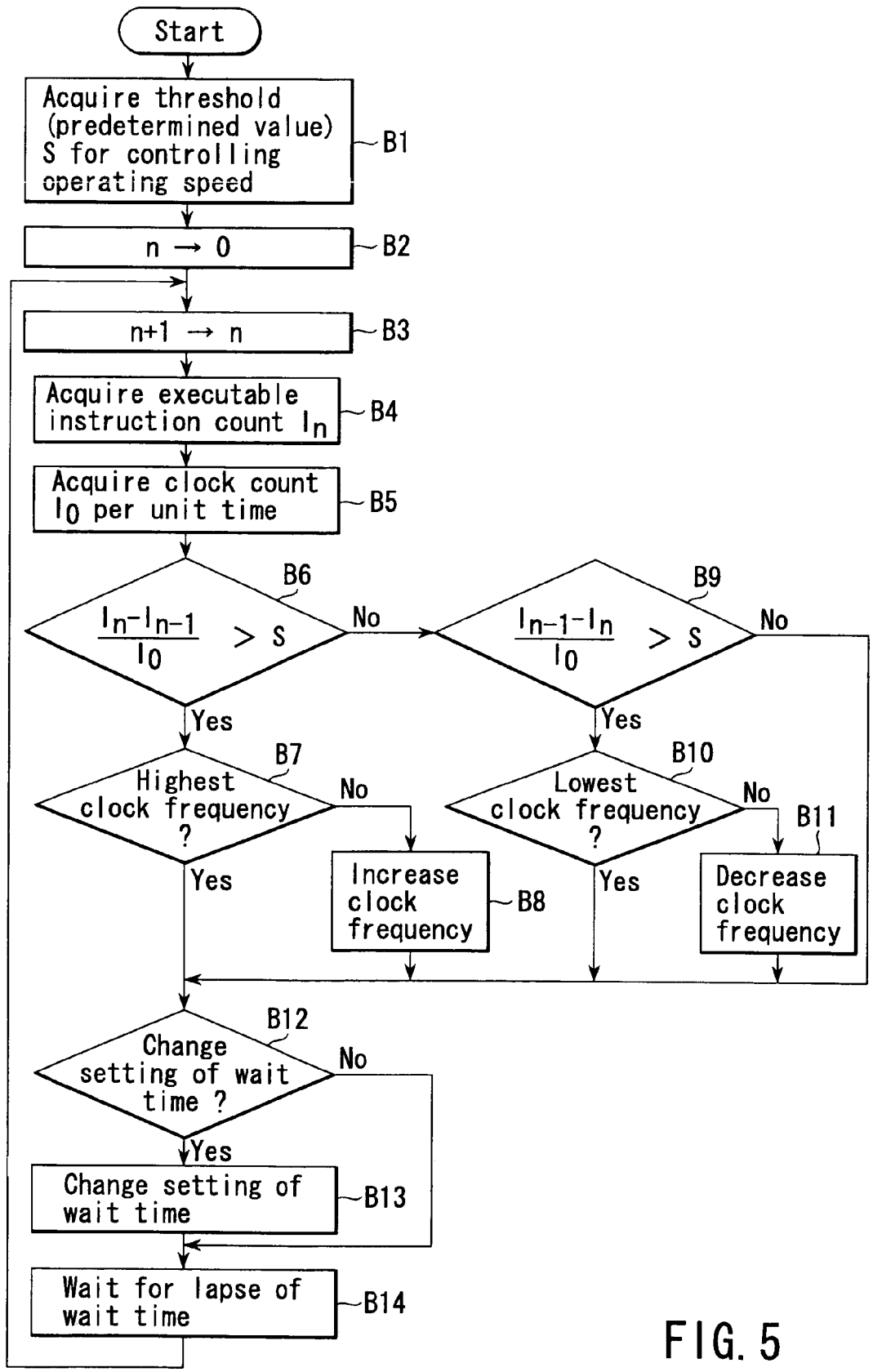
FIG. 5 is a flowchart showing the second operation example in the embodiment.

FIG. 5 shows operation corresponding to calculation 2 described above.

When the electronic apparatus is activated, the determination unit 142 recognizes the type of operation mode of the CPU 2, and acquires a threshold S corresponding to the operation mode in advance by looking up the threshold table 143 (step B1).

A count value n representing the ordinal acquisition number of the executable instruction count/clock count is reset to 0, and stored in a predetermined memory area (step B2).

In order to start acquisition of the executable instruction count/clock count, the current count value is incremented by 1 (step B3).

The executable instruction count/clock count acquisition unit 141 of the control unit 14 acquires the executable instruction count I per unit time and the clock count $I_0$ per unit time, and sends these pieces of information to the determination unit 142 (steps B4 and B5).

The determination unit 142 executes "$(I_n-I_{n-1})/I_0$" ($I_n$ is the executable instruction count per unit time in the nth acquisition, and $I_0$ is the clock count per unit time). The determination unit 142 determines whether the calculation result exceeds the threshold S (step B6).

If the determination unit 142 determines that the calculation result exceeds the threshold S (YES in step B6), and the clock frequency of the CPU 2 is not highest (NO in step B7), the clock frequency change instruction unit 144 performs control of increasing the clock frequency by a predetermined amount (step B8). If the clock frequency of the CPU 2 is highest (YES in step B7), the clock frequency is not changed.

If the determination unit 142 determines that the calculation result does not exceed the threshold S (NO in step B6), the determination unit 142 executes "$(I_{n-1}-I_n)/I_0$", and determines whether the calculation result exceeds the threshold S (step B9). If the determination unit 142 determines that the calculation result exceeds the threshold S (YES in step B9), and the clock frequency of the CPU 2 is not lowest (NO in step B10), the clock frequency change instruction unit 144 performs control of decreasing the clock frequency by a predetermined amount (step B11). If the clock frequency of the CPU 2 is lowest (YES in step B10), the clock frequency is not changed.

The wait time setting unit 145 determines whether to change the setting of the wait time (step B12). If YES in step B12, the wait time setting unit 145 changes the setting of the wait time (step B13), and waits for the lapse of the changed wait time (step B14). Upon the lapse of the wait time, the wait time setting unit 145 activates the executable instruction count/clock count acquisition unit 141. If NO in step B12, the wait time setting unit 145 waits for the lapse of the wait time which has already been set (step B14). Upon the lapse of the wait time, the wait time setting unit 145 activates the executable instruction count/clock count acquisition unit 141.

In the second operation example, whether the ratio of the difference between two executable instruction counts acquired successively to the clock count exceeds a predetermined value is determined. The clock frequency of the CPU 2 is controlled in accordance with the determination result, achieving power saving corresponding to the substantial use ratio of the CPU 2.

<Third Operation Example>

Figure 6:
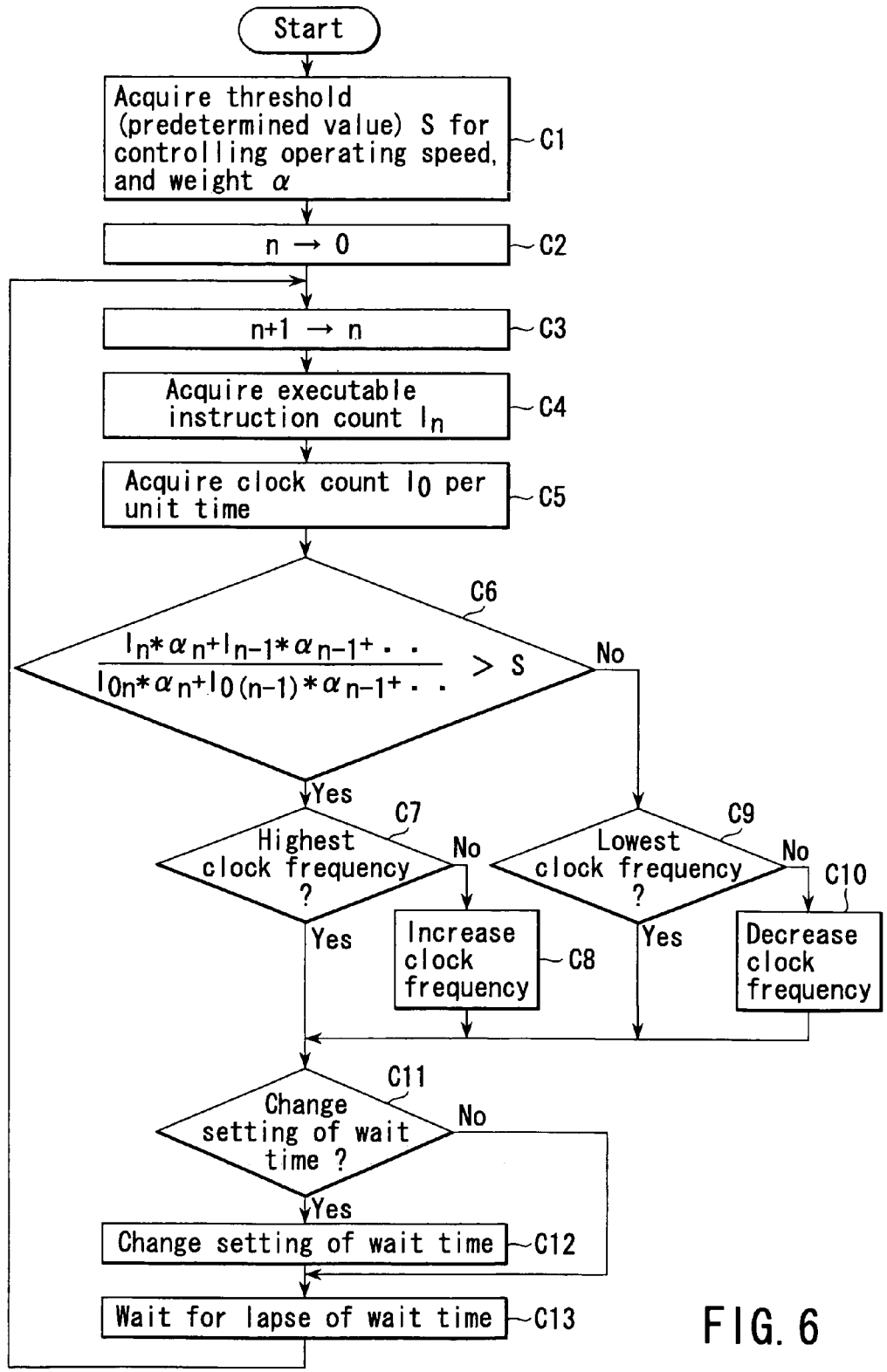
FIG. 6 is a flowchart showing the third operation example in the embodiment.

FIG. 6 shows operation corresponding to calculation 3 described above.

When the electronic apparatus is activated, the determination unit 142 recognizes the type of operation mode of the CPU 2, and acquires a threshold S corresponding to the operation mode in advance by looking up the threshold table 143. At the same time, the weighting factor α which is stored in a predetermined memory area is acquired in advance (step C1).

The count value n representing the acquisition number of the executable instruction count/clock count is reset to 0, and stored in a predetermined memory area (step C2).

In order to start acquisition of the executable instruction count/clock count, the current count value is incremented by 1 (step C3).

The executable instruction count/clock count acquisition unit 141 of the control unit 14 acquires the executable instruction count I per unit time and the clock count $I_0$ per unit time, and sends these pieces of information to the determination unit 142 (steps C4 and C5).

The determination unit 142 executes calculation "$(I_n*\alpha_n + I_{n-1}*\alpha_{n-1} + \ldots)/(I_{0n}*\alpha_n + I_0(n-1)*\alpha_{n-1} + \ldots)$" ($I_n$ is the executable instruction count per unit time in the nth acquisition, $I_{0n}$ is the clock count per unit time in the nth acquisition, and $\alpha_n$ is the weighting factor applied to information in the nth acquisition). The determination unit 142 determines whether the calculation result exceeds the threshold S (step C6).

In this calculation, the number of terms used for a numerator formula and dominator formula may be limited to a predetermined number. In this case, a term concerning the oldest acquired information may be excluded (deleted) from the calculation. This can reduce the capacity of information held in the memory area.

If the determination unit 142 determines that the calculation result exceeds the threshold S (YES in step C6), and the clock frequency of the CPU 2 is not highest (NO in step C7), the clock frequency change instruction unit 144 performs control of increasing the clock frequency by a predetermined amount (step C8). If the clock frequency of the CPU 2 is highest (YES in step C7), the clock frequency is not changed.

If the determination unit 142 determines that the calculation result does not exceed the threshold S (NO in step C6), and the clock frequency of the CPU 2 is not lowest (NO in step B9), the clock frequency change instruction unit 144 performs control of decreasing the clock frequency by a predetermined amount (step C10). If the clock frequency of the CPU 2 is lowest (YES in step C9), the clock frequency is not changed.

The wait time setting unit 145 determines whether to change the setting of the wait time (step C11). If YES in step C11, the wait time setting unit 145 changes the setting of the wait time (step C12), and waits for the lapse of the changed wait time (step C13). Upon the lapse of the wait time, the wait time setting unit 145 activates the executable instruction count/clock count acquisition unit 141. If NO in step C11, the wait time setting unit 145 waits for the lapse of the wait time which has already been set (step C13). Upon the lapse of the wait time, the wait time setting unit 145 activates the executable instruction count/clock count acquisition unit 141.

In the third operation example, whether the ratio of the sum of executable instruction counts which are successively acquired and multiplied by a predetermined weighting factor to the sum of clock counts which are successively acquired and multiplied by a predetermined weighting factor exceeds a predetermined value is determined. The clock frequency of the CPU 2 is controlled in accordance with the determination result, achieving power saving corresponding to the substantial use ratio of the CPU 2.

As described above, this embodiment adopts a control unit which controls the frequency of an internal clock generated in the CPU 2 in accordance with the ratio of the executable instruction count per unit time to the clock count per unit time of the CPU 2. The embodiment can perform power saving control corresponding to the substantial use ratio of the CPU 2.

The functional arrangement of the control unit is not limited to the one shown in FIG. 2, and can be modified as far as the same operation can be realized.

As has been described in detail above, according to the present invention, it is possible to control power consumption corresponding to the substantial use ratio of a processor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling a clock frequency of a processor, comprising:
   acquiring an executable instruction count per unit time of the processor, the count being a count of instructions related to software programs, including an application and an operating system (OS), executed by the processor;
   acquiring a clock count per unit time of the processor;
   determining whether a ratio of the executable instruction count to the clock count exceeds a predetermined value; and
   controlling the clock frequency of the processor in accordance with a result of the determination,
   wherein the determination includes determining whether a ratio of i) a sum of executable instruction counts which are successively acquired and multiplied by a predetermined weighting factor to ii) a sum of clock counts which are successively acquired and multiplied by a predetermined weighting factor exceeds a predetermined value.

2. The method according to claim 1, wherein a series of processes including the acquisition of the executable instruction count, the acquisition of the clock count, the determination, and the control of the clock frequency are repetitively executed at a predetermined time interval.

3. The method according to claim 2, wherein the predetermined time interval is changeable.

4. The method according to claim 1, wherein the control includes controlling to decrease the clock frequency of the processor when the ratio is determined not to exceed the predetermined value.

5. The method according to claim 1, wherein the determination includes determining whether a ratio of i) a difference between two executable instruction counts acquired successively to ii) the clock count exceeds a predetermined value.

6. The method according to claim 1, wherein the control includes increasing the clock frequency when the ratio is determined as a result of the determination to exceed the predetermined value, and decreasing the clock frequency when the ratio is determined not to exceed the predetermined value.

7. The method according to claim 1, wherein the predetermined value is changeable.

8. The method according to claim 1, wherein controlling comprises:
   determining an operational mode from a plurality of operational modes, associated with a plurality of threshold values;
   selecting a threshold value associated with the determined operational mode as the predetermined value; and
   changing the clock frequency of the processor based on the ratio and the predetermined value.

9. The method according to claim 8, wherein the plurality of operational modes include at least a power saving mode, a standard mode, and a high-speed mode.

10. An electronic apparatus, comprising:
    a clock oscillator configured to supply a clock signal;
    a processor configured to generate an internal clock on the basis of the clock signal supplied from the clock oscillator; and
    a control unit configured to control a frequency of the internal clock in accordance with a ratio of an executable instruction count per unit time to a clock count per unit time of the internal clock generated by the processor, the count being a count of instructions related to software programs, including an application and an operating system (OS), executed by the processor, wherein the control unit determines whether a ratio of i) a sum of executable instruction counts which are successively acquired and multiplied by a predetermined weighting factor to ii) a sum of clock counts which are successively acquired and multiplied by a predetermined weighting factor exceeds a predetermined value, and controls a clock frequency of the processor in accordance with a result of the determination.

11. The apparatus according to claim 10, wherein the control unit determines whether the ratio of the executable instruction count to the clock count exceeds a predetermined value, and controls a clock frequency of the processor in accordance with a result of the determination.

12. The apparatus according to claim 10, wherein the control unit determines whether a ratio of i) a difference between two executable instruction counts acquired successively to ii) the clock count exceeds a predetermined value, and controls a clock frequency of the processor in accordance with a result of the determination.

13. The apparatus according to claim 10, wherein the control unit increases the clock frequency when the ratio is determined to exceed the predetermined value, and decreases the clock frequency when the ratio is determined not to exceed the predetermined value.

14. A method of controlling a clock frequency of a processor, comprising:

acquiring an executable instruction count per unit time of the processor, the count being a count of instructions related to software programs, including an application and an operating system (OS), executed by the processor;

acquiring a clock count per unit time of the processor;

determining whether a ratio of the executable instruction count to the clock count exceeds a predetermined value;

controlling the clock frequency of the processor in accordance with a result of the determination;

determining an operational mode from a plurality of operational modes, associated with a plurality of threshold values;

selecting a threshold value associated with the determined operational mode as the predetermined value; and changing the clock frequency of the processor based on the ratio and the predetermined value, wherein selecting the threshold value further includes:

searching a table containing information about relationships between the operational modes and the threshold values; and selecting the threshold value associated with the determined operational mode as the predetermined value.

* * * * *